United States Patent [19]

Maeda et al.

[11] 4,085,410
[45] Apr. 18, 1978

[54] PHOTOFLASH MOUNTING AUTOMATIC LIGHT CONTROL CAMERA

[75] Inventors: Keisuke Maeda, Osaka; Akira Yamanaka, Sakai, both of Japan

[73] Assignee: Minolta Camera Kabushiki Kaisha, Osaka, Japan

[21] Appl. No.: 688,218

[22] Filed: May 20, 1976

[30] Foreign Application Priority Data

May 30, 1975 Japan .................................. 50-65931

[51] Int. Cl.² .............................................. G03B 7/18
[52] U.S. Cl. ..................................... 354/21; 354/126; 354/141; 354/145
[58] Field of Search ....................... 354/21, 28, 41, 42, 354/49, 58, 59, 126, 132, 141, 145; 240/1.3

[56] References Cited

U.S. PATENT DOCUMENTS

| 3,395,630 | 8/1968 | Haufler | 354/21 |
| 3,505,937 | 4/1970 | Albedyll et al. | 354/21 |
| 3,601,021 | 8/1971 | Easterly | 354/41 |
| 3,662,666 | 5/1972 | Neudecker et al. | 354/126 |
| 3,848,985 | 11/1974 | Bennett | 354/21 |
| 3,922,695 | 11/1975 | Müller | 354/141 |
| 4,003,062 | 1/1977 | Galbraith | 354/126 |

Primary Examiner—L. T. Hix
Assistant Examiner—Alan Mathews
Attorney, Agent, or Firm—Wolder & Gross

[57] ABSTRACT

A camera accommodating film cartridges having structural signals differently configured according to the corresponding film speeds and selectively accepting a photoflash unit with a predetermined high guide number and a photoflash unit with a predetermined low guide number is provided with an automatic diaphragm mechanism which, in flashbulb photography, adjusts the aperture according to the object to camera distance. The camera includes a luminosity attenuator for guide number compensation and a luminosity attenuator for film speed compensation, each attenuator being displaceable between a nonattenuating position displaced from the camera objective light path and an attenuating position in said light path. Internal of the camera is a first sensor for differential detection of the guide number classification of a photoflash unit to be mounted on the camera for flashbulb photography. The luminosity attenuator for guide number compensation is operatively associatable with the first sensor and assumes the attenuating position only when the sensor has detected the mounting of a photoflash unit with the predetermined high guide number. The camera includes a second sensor for reading the film speed of the cartridge loaded in the camera from the cartridge signal structure. The light attenuator for film speed compensation is operatively associated with the second sensor so that the former assumes the luminosity attenuating position when the second sensor has detected a film speed higher than the preset camera speed rating or when, with a photoflash unit mounted, the second sensor has detected a higher film speed. The camera is such that both the guide number and film speed setting or compensating functions are automatically performed in flashbulb photography.

11 Claims, 4 Drawing Figures

LOW SPEED FILM

HIGH SPEED FILM

LOW SPEED FILM
MEDIUM SPEED FILM
HIGH SPEED FILM

PHOTOFLASH MOUNTING AUTOMATIC LIGHT CONTROL CAMERA

BACKGROUND OF THE INVENTION

The present invention relates generally to a photographic camera provided with an automatic light control and it relates more particularly to a camera adapted to accept any of film cartridges having structural signals differently configured according to the corresponding film speeds and capable of accepting, selectively, a photoflash unit with a predetermined high guide number and a photoflash unit with a predetermined low guide number and effecting an automatic guide number and film speed adjustment of the camera for flashbulb photography.

A photographic camera in which the mounting of a photoflash unit thereon for flashbulb photography sets the shutter speed to a predetermined value is known. In such a camera, exposure control for flashbulb photography is provided by an automatic diaphragm mechanism which adjusts the aperture in response to the operation of a focussing member. This automatic diaphragm mechanism is such that it provides a wide aperture when the focussing member is set somewhere in the 'Distant' range and progressively narrower aperture as said member is shifted toward and past the 'Close' range. However, even when the focussing member has been set to a given distance, if the photoflash unit mounted on the camera has a guide number different from that preset on the camera, proper exposure control is not provided unless the aperture setting is altered. To solve this problem, the conventional camera has been designed and constructed so that an adjusting member capable of adjusting the aperture is additionally provided in association with the automatic diaphragm mechanism, said additional adjusting member being actuatable by manipulating a guide number setting member located externally of the camera. Thus, before performing flashbulb photography, the photographer adjusts the aperture of the camera by operating the guide number setting member according to the photoflash unit employed. The automatic diaphragm mechanism also requires an aperture adjustment according to the speed rating of the film. Thus, since any automatic diaphragm mechanism is preset to a given film speed, the employment of a film with a speed higher than said given speed would result in over-exposure. It is for this reason that in the conventional camera, a second adjusting member is provided in association with the automatic diaphragm mechanism or the first mentioned adjusting member for adjusting the aperture setting, the second adjusting member being actuatable with a film speed setting member located externally of the camera.

In the conventional camera having the above construction however, before a suitable photographic performance can occur in flashbulb photography, the guide number and film speed setting members of the camera must be manipulated to adjust the built-in automatic diaphram mechanism to the particular photoflash unit and type of film employed. This arrangement is disadvantageous in that when the photographer is an amateur not skilled in the operation of the camera or due to simple improper manipulation, these setting operations are sometimes inadvertently omitted or erroneously performed, the outcome being a failure to achieve the proper exposure.

Furthermore, when the diaphragm mechanism is interposed between a lens system as is conventionally done, it is technically difficult to establish an integral relationship between the automatic diaphragm mechanism and each of the adjusting members and the assembly and positioning operations involved are highly time consuming. Another disadvantage is that the dimensional errors of the various component parts, when added together, cause an inability to attain an accurate exposure control.

SUMMARY OF THE INVENTION

It is therefore a principal object of the invention to provide a camera equipped with an automatic light control such that the guide number and film speed setting functions are automatically effected by, and as the consequence of mounting a photoflash unit on the camera and loading a film cartridge therein, so that the undesirable consequence of any negligence or the improper setting on the part of the photographer will be precluded.

It is another object of the present invention to provide a camera incorporating an automatic light control which is simple in construction, easy to assemble and to perform necessary positioning adjustments thereon in assembling and, in operation, capable of providing an accurate exposure compensation without being influenced by the dimensional errors inherent in its various component parts.

DESCRIPTION OF THE PREFERRED EMBODIMENTS

Figure 1:
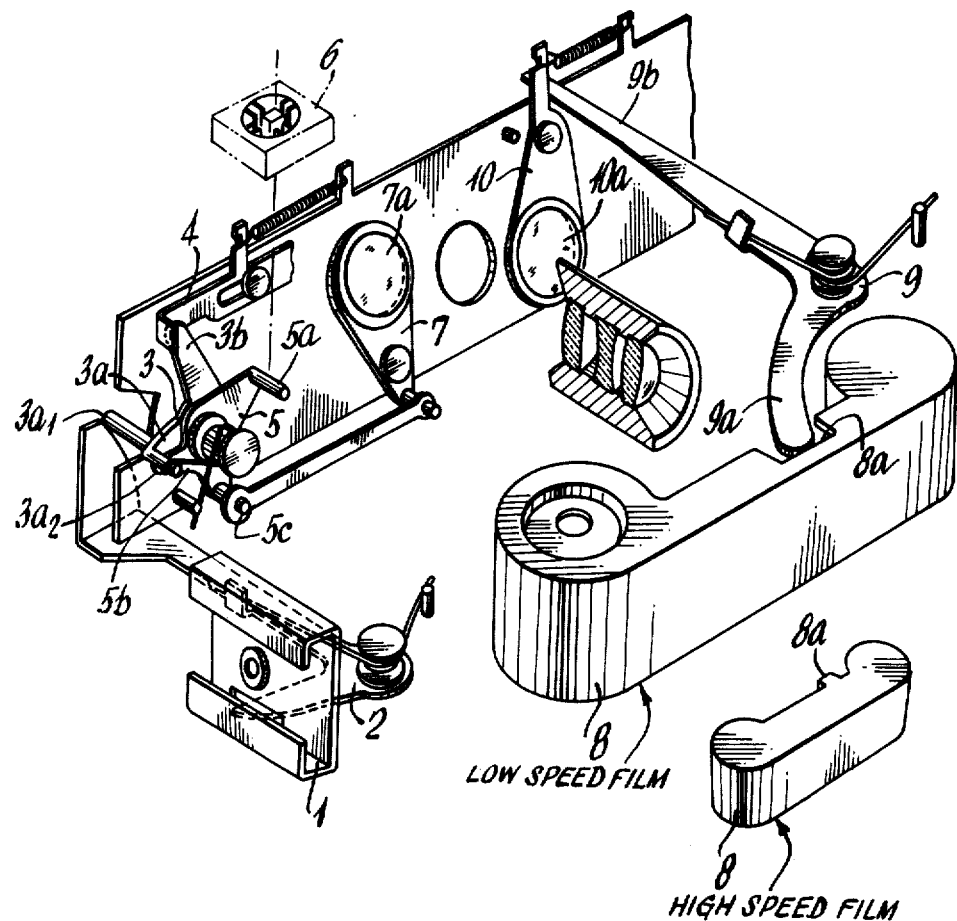
FIG. 1 is a fragmentary perspective view of an embodiment of the present invention.

Referring now to the drawings, particularly FIG. 1 thereof which illustrates a preferred embodiment of the present invention, the reference numeral 1 generally designates an accessory shoe or coupling mount of well known construction which is rigidly secured to a camera body (not shown), 2 is a swingably mounted sensor member for detecting the mounting or dismounting of a photoflash unit or speedlight being resiliently spring biased in a counterclockwise direction and one end thereof projecting into said accessory shoe 1. Indicated by reference numeral 3 is a control member pivotally mounted and spring biased in a counterclockwise direction, one arm 3a of the control member 3 being provided with an engaging pin $3a_1$ adapted to engage the other end of the sensor member 2, and with a restraining pin $3a_2$ for limiting the rotation of the control member 3 in the counterclockwise direction. Reference numeral 4 indicates an actuating slide lever which is adapted to actuate a well-known automatic diaphragm mechanism (not shown) designed to adjust the aperture setting according to the subject-to-flash distance in flashbulb photography. The acutating lever 4 is so configured as to be slidable in a transverse direction and is spring biased toward the right. The lever 4 is further adapted to actuate the automatic diaphragm mechanism only when it has been displaced to the right from the illustrated position. This sliding motion of actuating lever 4 toward the right is restricted by engagement of another arm 3b or the control member 3 with a bend formed at the lefthand end of lever 4.

Designated by the reference numeral 5 is a drive member rotatably mounted coaxially with the control member 3. The drive member 5 has a sensor portion or finger 5a extending to a position under a flashbulb mount 6 adapted to accept a flashcube or Magicube, an engaging portion 5b for engaging the restraining pin $3a_2$ of control member 3, and a connecting pin or portion 5c. The sensor portion 5a is prevented from rotating in a counterclockwise direction by abutment against the underside of the flashbulb mount 6, and from rotating in a clockwise direction by engagement of the engaging portion 5b with the restraining pin $3a_2$. In other words, the drive member 5 is in a stationary position as illustrated. The drive member 5 is so designed that, upon mounting of a photoflash unit to the mount 6, it is driven in a clockwise direction as the sensor member 5a is depressed. Reference numeral 7 designates a rotatably supported holder member for retaining a luminosity attenuator member 7a which is a neutral density filter, the holder member 7 being adapted and disposed so that its clockwise rotation through a predetermined angle brings the luminosity attenuator member 7a into the optical path of the camera, that is, the camera objective lens optical axis. The movement of the holder member 7 is controlled by the drive member 5 connected to one end thereof by way of the connecting portion 5c. Generally shown at 8 is a film cartridge with an external index or signal structure 8a, e.g. a recess or projection, the configuration of which varies with the sensitivity or speed of the film.

Reference numeral 9 represents a control lever having a sensor portion 9a for reading the film speed by way of the index and a control portion 9b, the control lever 9 being spring biased in a counterclockwise direction. A holder member 10 carrying a luminosity attenuator 10a which is a neutral density filter is rotatably mounted in such a manner that the luminosity attenuator 10a may make its entry into the optical path or its exit therefrom according to the direction of rotation of the holder member. While the holder member 10 is spring biased in a clockwise direction, its rotation is restricted by the control portion 9b of control lever 9 engaging one end thereof.

In the above construction of the improved mechanism of the present invention, when a picture is to be taken using a photoflash unit with a predetermined low guide number (a speedlight is indicated as an example in the illustrated embodiment), the photoflash unit is mounted on the accessory shoe 1 in the first place. Thereupon, the sensor member 2 rotates clockwise as its end projecting into accessory shoe 1 is depressed or pushed, the other end of the sensor member 2 pushing the engaging pin $3a_1$ of control member 3 to drive said member 3 in a clockwise direction. Upon clockwise rotation of control member 3, the actuating lever 4 is disengaged from arm 3b and slides to the right, rendering the automatic diaphragm mechanism operative. In the above situation, since the control member 3 only is driven in a clockwise direction and the drive member 5 is not driven but remains in a stationary position as depicted, the luminosity attenuator member 7a is retained in a position displaced from the path of light.

Thus, the quantity of light controlled to an appropriate level by the operation of the automatic diaphragm mechanism reaches the film without being hindered in any manner by a luminosity attenuator member, thus allowing a flashbulb photograph to be taken with the proper exposure.

The following description pertains to the instance in which a picture is taken using a photoflash unit with a high guide number (a flashcube is indicated as an example in the illustrated embodiment). Upon mounting a flashcube in the flashbulb mount 6, the sensor portion 5a is depressed to rock the drive member 5 in a clockwise direction. In response to this clockwise rotation of drive member 5, its engaging portion 5b pushes the restraining pin $3a_2$ of the control member 3, thereby driving the control member 3 in a clockwise direction. Thereupon, the actuating lever 4 is released from engagement with arm 3b to slide to the right, rendering the automatic diaphragm (not shown) operative. At the same time, the clockwise rotation of the drive member 5 drives the holder 7 associated therewith in a clockwise direction, thus bringing the luminosity attenuator member 7a supported at one end of holder 7 into the optical path of the camera. If a picture is taken in the above condition, the reflected light from the object passes through the luminosity attenuator member 7a and, thereby, is reduced to the proper level before it is incident on the film, where the proper exposure occurs as a consequence.

It is thus apparent that the luminosity attenuator member 7a, which is a guide number compensator, is retracted from the optical path of the camera when a photoflash unit with a low guide number (a speedlight in the illustrated embodiment) is mounted on the camera, and is advanced into the path of light only when a photoflash unit with a high guide number (a flashcube in the illustrated embodiment) is mounted, thus adjusting the quantity of light incident via said automatic diaphragm mechanism to a level conducive to a proper exposure.

The compensation for the sensitivity of film is hereinafter described. As aforesaid, each film cartridge is provided with a signal structure or sturctural index 8a, the configuration of which varies with the film speed. The signal structure 8a may be a recess or notch in the case of a low-speed film cartridge or a projection or lobe for a high-speed film cartridge. When the camera is loaded with a low-speed film cartridge having the above shaped signal structure, the sensor portion 9a fits into the signal structure 8a which, as aforesaid, is a recess in the cartridge, with the result that the control lever 9 is precluded from displacement and retained in a stationary position. Therefore, the luminosity attenuator member 10a for film speed compensation is precluded from its clockwise rotation by control portion 9b and retained in the depicted or retracted position outside of the optical path of the camera. If a picture is taken in the above situation, because the camera as such has been constructed specifically for low-speed film the incident flash light will be of a proper preset quantity and because said luminosity attenuator member 10a is positioned outside the optical path of the camera as aforementioned, the light is not attenuated but retains the proper level as it is incident upon the film and exposes it.

Upon loading of the camera with a high-speed cartridge having a signal structure 8a which, as aforesaid, is a lobe, the control lever 9 is driven in a clockwise direction as its sensor portion 9a is pushed by projecting signal portion 8a, whereupon the holder 10 is released or disengaged from control portion 9b and rotates through a predetermined angle owing to the spring bias thereof in a clockwise direction, thus bring the luminosity attenuator 10a, which as aforesaid is an ND filter, into the camera path of light. If a picture is taken under these latter circumstances, the light reflected from the object passes through the luminosity attenuator member 10a, by which it is attenuated to the proper level for exposure.

Thus, when the camera is loaded with a low-speed film, the luminosity attenuator member 10a is in a retracted position outside the optical path of the camera to permit a free, undetered influx of the incident light to the film, thereby allowing the proper exposure to take place. Upon loading of the camera with a high-speed film, the attenuator member 10a is advanced into the path of light to reduce the excess incident light to a level appropriate to the high-speed film and, thereby cause the film to be properly exposed.

Figure 2:
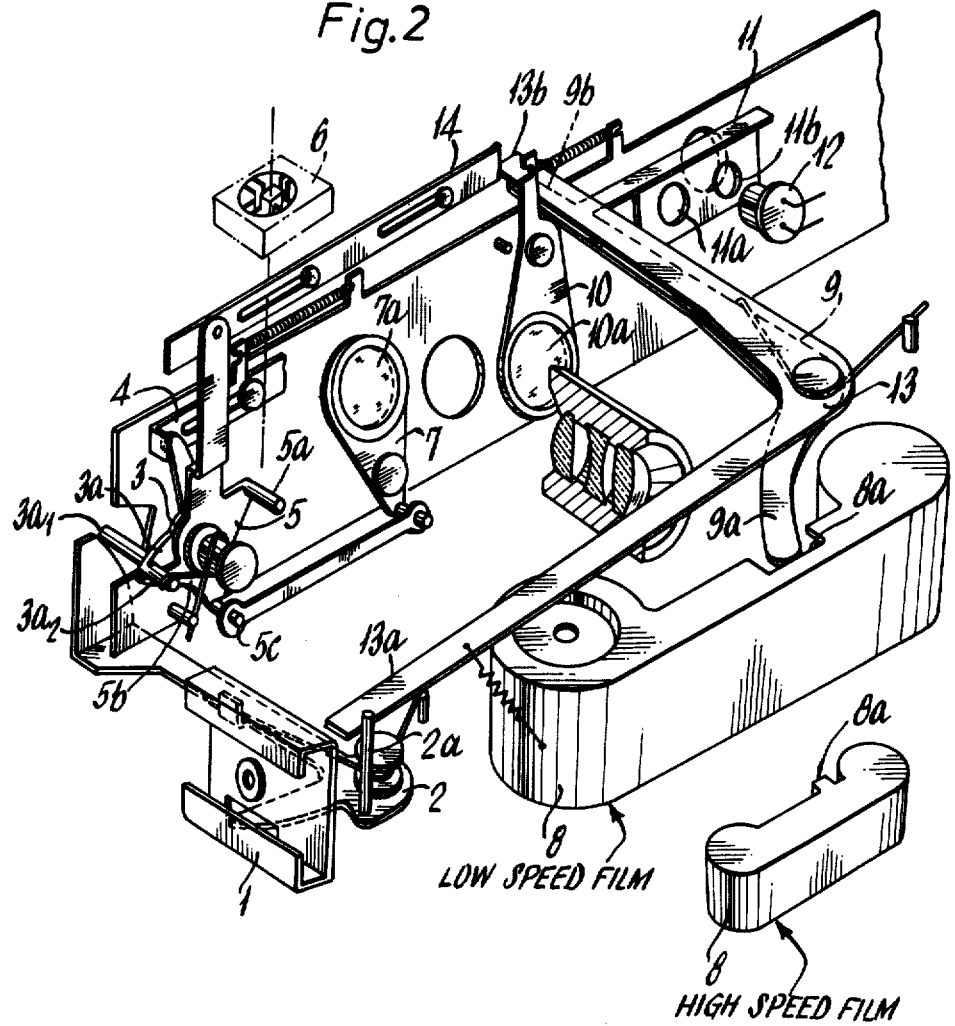
FIG. 2 is a fragmentary perspective view of another embodiment of the present invention.

The above described embodiment illustrated in FIG. 1 represents an application of the present invention to a camera which operates so that in taking a picture under daylight conditions without the aid of a photoflash, film-speed compensation is also accomplished by a luminosity attenuator member 10a. It should be understood that the present invention is also applicable to great advantage to a camera in which, in daylight photography, film-speed compensation is accomplished by controlling the amount of incident light to a photosensor element and varying the shutter speed based on the quantitative incident light information. In FIG. 2 is depicted an embodiment of the present invention embodying the above application concept. The members having the like functions as those of the corresponding members shown in FIG. 1 are designated by like numerals so as to avoid a duplication of description. Reference numeral 11 designates an incident light control member provided in front of a photosensor element 12, said control member having an aperture 11a for a high-speed film and an aperture 11b for a low-speed film, the latter aperture being smaller than the former aperture or, alternatively, formed of the same ND filter as the luminosity attenuator member 10a for film-speed compensation. The incident light control member 11 is operatively associatable with said control lever 9 in such a manner that, upon loading the camera with a high-speed film, the high-speed aperture 11a is brought into a position in registry with or forwardly of the photosensor element 12 and, conversely, upon loading of a low-speed film, the low-speed aperture 11b is brought into a position in registry with or forwardly of photosensor element 12. The photosensor element 12 is adapted to control the shutter speed in response to the amount of light incident thereon in the known manner. In taking a picture under daylight conditions, film-speed compensation is accomplished by bringing one of apertures or the other into operative position and thereby altering the amount of incident light to control the shutter speed.

Indicated by reference numeral 13 is an L-shaped lever rotatably mounted coaxially with the control lever 9 and spring biased in a counterclockwise direction. The L-shaped lever 13 has a sensor arm 13a engaging the engaging pin 2a of the sensor member 2, and a control arm 13b engaging one end of the holder 10 to restrain the clockwise rotation of the holder 10. A release lever 14 is operatively associated with drive member 5 and is adapted to slide to the right only when said drive member 5 is driven in a clockwise direction by the mounting of a flashcube, the forward end of the release lever 14 resting against the control arm 13b of the control lever 13.

Considering the operation of the embodiment last described, the luminosity attenuator member 7a for guide number compensation functions in the same manner as the like member of the embodiment illustrated in FIG. 1. Thus, upon mounting of a photoflash unit with a low guide number (a speedlight in this embodiment), the attenuator member is not actuated but remains outside the path of light but, when a photoflash unit with a high guide number (a flashcube in the embodiment) is mounted, the member 7a is driven clockwise to make its entry into the optical path of the camera and, thereby to reduce the amount of light incident through the automatic diaphragm mechanism. The present embodiment being such that the control of light for daylight photography is accomplished by changing the amount of light incident on the photosensor element and thereby controlling the shutter speed, the luminosity attenuator member 10a for film speed compensation must not make its entry into the optical path of the camera in daylight photography even upon loading of a high-speed film. In this embodiment, the luminosity attenuator member 10a makes its entry into the optical path only when both a photoflash unit is mounted on the camera and the latter is loaded with a cartridge of high-speed film. Thus, upon mounting of a speedlight, the sensor member 2 is driven in a clockwise direction, with the result that the L-shaped lever 13 is driven by engaging pin 2a in a clockwise direction. When a flashcube is mounted, the clockwise rotation of drive member 5 causes the release lever 14 operatively associated therewith to push the control arm 13b, thus rotating the L-shaped lever 13 clockwise. Therefore, irrespective of which of a speedlight and a flashcube is mounted, the L-shaped lever is driven clockwise to release the holder 10 from its engagement with control arm 13b. Thus, with a photoflash unit having been mounted on the camera, the holder 10 is under restraint by sensor lever 9 as in the embodiment illustrated in FIG. 1 and it is rotated clockwise only when a high-speed film is loaded to bring the luminosity attenuator member 10a into position in the optical path of the camera.

The foregoing description of embodiments pertains to the employment of a flashcube or a Magicube as said photoflash unit with a high guide number and of a speedlight as said photoflash unit with a low guide number in accordance with the present invention. It should, however, be understood that the present invention may be applied with equal success in association with any other type of photoflash unit of a dual high and low guide number system (for example, Flipflash, registered trademark) and that, in such cases, all that is necessary is to employ flashbulb mounts configured to accept such photoflash units. It should also be understood that, while the flash mounts are disposed in somewhat remotely spaced relation in the above embodiments, they may of course be disposed in close proximity to each other.

Furthermore, each of the above embodiments is so constructed that the luminosity attenuator member is normally located outside the path of light and comes into the path of light only when the photoflash unit mounted on the camera has a high guide number, but the construction may be reversed so that the luminosity attenuator member will normally be located in the path of light and will be displaced from the path only when a photoflash unit carrying a low guide number is mounted.

Figure 3:
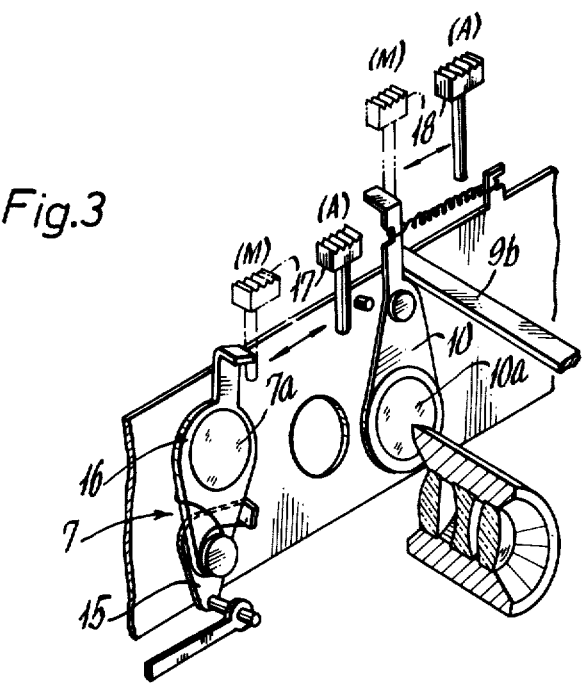
FIG. 3 is a fragmentary perspective view of still another embodiment of the present invention showing only some of the members thereof and their arrangement.

Furthermore, the luminosity attenuator members 7a and 10a may each be constructed so that it may be forced out of the path of light by manual operation from outside of the camera. In such a construction, if the luminosity attenuator member is thus forced out of the path of light, flashbulb photography will be rendered feasible even for a distant object. FIG. 3 illustrates an embodiment of the present invention which is predicated upon the above concept. The members represented by the same reference numerals as those used in the preceding embodiments each have the like functions. In this particular embodiment, a holder 7 consists of a first lever 15 connected to a drive member 5 and a second lever 16 rotatably mounted coaxially with said first lever 15. The second lever 16 is normally urged to move with said first lever as a unit by the co-action of a tab on said first lever 15 and a spring but when subjected to a force acting in a counterclockwise direction, is driven alone in a counterclockwise direction independently of said first lever 15. Reference numeral 17 designates a release member disposed within the path of motion of the second lever 16, the member 17 being displaceable between a position generally shown at A where it engages said second lever 16 when the latter brings the luminosity attenuator member 7a into the path of light to a position generally shown at M where it engages said second lever 16 while the latter detains the luminosity attenuator 7a outside of the path of light. It is so designed that when the release member 17 is in M-position, it remains in that position by overcoming the urging influence of a spring interposed between the two levers, by means of a click mechanism which is well know per se. Indicated by reference numeral 18 is a release member having a construction similar to that of release member 17, being displaceable between a position generally shown at A where it engages the holder 10 when the latter brings the luminosity attenuator member 10a into the path of light and a position generally shown at M where it engages the holder 10 when the latter has brought the member 10a out of the path of light. These release members 17 and 18 are each constructed to permit their operation from outside the camera. When the luminosity attenuator members 7a and 10a are located in the optical path, the displacement from A position to M position of said release members 17 and 18 displaces these luminosity attenuator members from in the optical path to out of the optical path. In the above construction, when the luminosity attenuator member 7a or 10a is located in the optical path of the camera, the same member may, if necessary, be displaced from the path of light simply by moving, from outside the camera, the release member 17 or 18 to a position generally shown at M as indicated by the imaginary line, whereby the level of available light may be virtually increased and a flash picture may be taken of even an object located at a distance.

Figure 4:
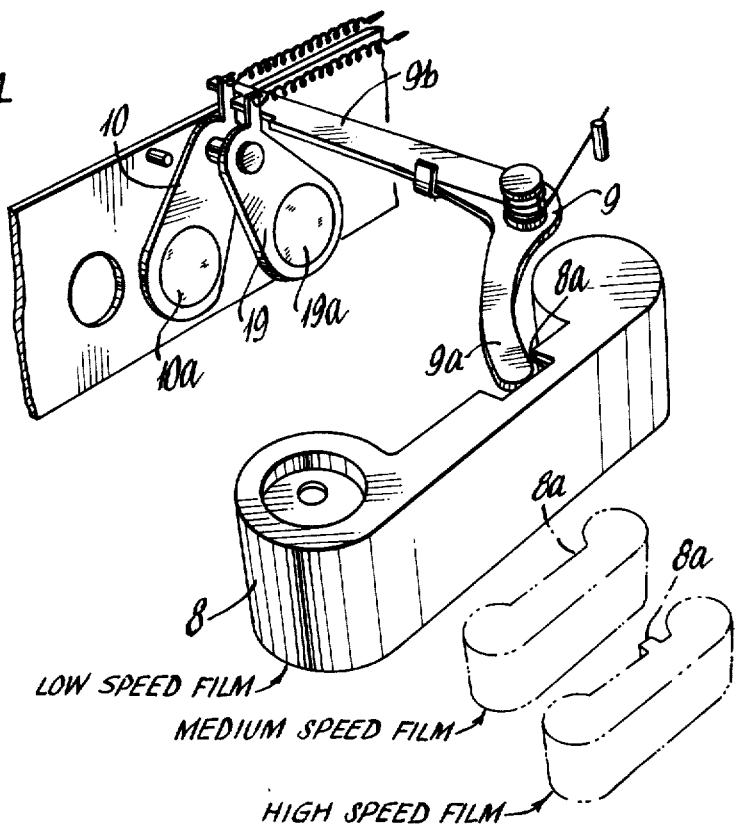
FIG. 4 is a view similar to FIG. 3 of a further embodiment of the present invention.

While the foregoing description is directed to the structure including only one luminosity attenuator member for film speed compensation, the present invention is not limited to such a construction but covers a construction incorporating a plurality of such luminosity attenuator members as in FIG. 4. In such construction, use may be made not only of a high and low speed film but also of films with intermediate or more diverse speeds. Thus, in the embodiment illustrated in FIG. 4 of the drawing, reference numeral 19 designates a holder configured similarly to the holder 10 described hereinbefore. Like holder 10, this holder 19 is spring biased in a clockwise direction and supports a luminosity attenuator member 19a at one end thereof. The control portion 9b of control lever 9 for actuating the luminosity attenuator is formed as a stepped member so that it may successively bring said two luminosity attenuators 10a and 19a into or out of the optical path of the camera. The film cartridges are also provided with different signal structures 8a, respectively, that is to say each signal structure having a distinct configuration, such as a notch, a projection or the like, the number of these dissimilarly configured signal structures being equal to the number of the luminosity attenuator members. In the above construction, the configuration of such structure 8a determines the amount of rotation of said control lever 9 and, in accordance with this amount of rotation one of the luminosity attenuators is brought into the optical path of the camera.

While there have been described and illustrated preferred embodiments of the present invention, it is apparent that numerous alterations, omissions and additions may be made without departing from the spirit thereof.

We claim:

1. A photographic camera having a first mount for releasably accepting a photoflash unit with a predetermined high guide number and a second mount for releasably accepting a photoflash unit with a predetermined low guide number, said camera including an automatic light control which comprises:
   a first sensor means being displaceable upon mounting of a photoflash unit with said predetermined high guide number on said first mount; and
   a first luminosity attenuating filter operatively connected with said first sensor means and being displaceable between a non-attenuating position displaced from the optical path of the camera and an attenuating position within said optical path in such a manner that the displacement by said first sensor means of the mounting of a photoflash unit with said predetermined high guide number and the consequent displacement of said first sensor means displaces said luminosity attenuating filter from said non-attenuating position to said attenuating position.

2. A photographic camera as set forth in claim 1 wherein said camera is adapted to accept a first film cartridge provided with a first signal structure having a first predetermined configuration and housing a first film having the same speed as that preset on the camera and a second film cartridge provided with a second signal structure having a second predetermined configuration different from said first predetermined configuration and housing a second film having a speed higher than said preset speed, and said luminosity attenuator means further includes
   a second sensor means for detecting the speed of film, said second sensor means being displaceable according to the configuration of the signal structure of the loaded film cartridge between a first detecting position where said first signal structure is detected and a second detecting position where said second signal structure is detected, and
   a second luminosity attenuator means for film speed compensation, said second luminosity attenuator means being operatively connected with said second sensor means and alternatively displaceable between a non-attenuating position displaced from the optical path of the camera and an attenuating position intercepting said optical path in such a manner that, when said second sensor means is in said first detecting position, said second attenuator is located in said non-attenuating position and when said second sensor means is displaced to said second detecting position, said second attenuator is displaced to said attenuating position.

3. A photographic camera as set forth in claim 2 including externally accessible manually operative means for shifting said first luminosity attenuator means from said attenuating position to said non-attenuating position.

4. A photographic camera as set forth in claim 3 including externally accessible manually operative means for shifting said second luminosity attenuator means from said attenuating position to said non-attenuating position.

5. A photographic camera as set forth in claim 2 wherein said second luminosity attenuator means for film speed compensation comprises a plurality of independently displaceable luminosity attenuator components, the amount of displacement of each of said luminosity attenuator components being different from that of any other luminosity attenuator component.

6. A photographic camera as set forth in claim 1 wherein said camera is adapted to accept a first film cartridge provided with a first signal structure having a first predetermined configuration and housing a first film having the same speed as that preset on the camera, and a second film cartridge provided with a second signal structure having a second predetermined configuration different from said first predetermined configuration and housing a second film having a speed higher than said preset speed, and said luminosity attenuator means further includes;
   a control means displaceable upon mounting of a photoflash unit on either said first mount or said second mount;
   a second sensor means for detecting the speed of film, said second sensor means being displaceable according to the configuration of the signal structure of the loaded film cartridge between a first detecting position wherein said first signal structure is detected and a second detecting position wherein said second signal structure is detected; and
   a second luminosity attenuator means displaceable between a non-attenuating position displaced from the optical path of the camera and an attenuating position aligned with said optical path in response to said control means and said second sensor means and said second luminosity attenuator means being displaced from said non-attenuating position to said attenuating position upon concurrent displacement of said control means and said second sensor means from said first detecting position to said second detecting position.

7. A photographic camera as set forth in claim 6 including externally accessible manually operative means for shifting said first luminosity attenuator means from said attenuating position to said non-attenuating position.

8. A photographic camera as set forth in claim 7 including externally accessible manually operative means for shifting said second luminosity attenuator means for film speed compensation from said attenuating position to said non-attenuating position.

9. A photographic camera as set forth in claim 6, wherein said second luminosity attenuator means comprises a plurality of independently displaceable luminosity attenuator components, the amount of displacement of each of said components from said non-attenuating position to said attenuating position is different from that of any other luminosity attenuator component.

10. The automatic light control of claim 1 wherein said first luminosity attenuating filter is normally in said non-attenuating position and said first sensor means is responsive to the mounting of said photoflash unit of said predetermined high guide number on said first mount, for transfering said first luminosity attenuating filter to said attenuating position.

11. The automatic light control of claim 10 further comprising manually operative means accessible externally of said camera for shifting said attenuating filter from said attenuating position to said non-attenuating position.

* * * * *